United States Patent
Dennis et al.

(10) Patent No.: US 10,564,823 B1
(45) Date of Patent: Feb. 18, 2020

(54) MOBILE DEVICE TRANSPARENT SCREEN OVERLAY

(71) Applicant: Sprint Communications Company L.P., Overland Park, KS (US)

(72) Inventors: Drew Thomas Dennis, Gardner, KS (US); An Thanh Nguyen, Kansas City, MO (US); M. Jeffrey Stone, Boynton Beach, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/724,243

(22) Filed: Oct. 3, 2017

(51) Int. Cl.
| *G06F 3/0484* | (2013.01) |
| *H04L 29/08* | (2006.01) |
| *G06F 21/32* | (2013.01) |
| *G06F 3/0488* | (2013.01) |
| *H04W 4/24* | (2018.01) |

(52) U.S. Cl.
CPC ........ *G06F 3/04842* (2013.01); *G06F 3/0488* (2013.01); *G06F 21/32* (2013.01); *H04L 67/26* (2013.01); *H04W 4/24* (2013.01)

(58) Field of Classification Search
CPC .... G06F 3/04842; G06F 21/32; G06F 3/0488; H04L 67/26; H04W 4/24
See application file for complete search history.

(56) References Cited

U.S. PATENT DOCUMENTS

| 9,842,330 | B1* | 12/2017 | Van Os | G06Q 20/327 |
| 2009/0309742 | A1* | 12/2009 | Alexander | G08B 21/10 340/601 |
| 2012/0244841 | A1* | 9/2012 | Teng | H04M 1/67 455/411 |
| 2012/0270527 | A1* | 10/2012 | Smith | H04M 3/4878 455/414.3 |
| 2013/0124258 | A1* | 5/2013 | Jamal | G06Q 30/02 705/7.29 |
| 2015/0026060 | A1* | 1/2015 | Krietzman | G06Q 20/3221 705/44 |
| 2015/0127455 | A1* | 5/2015 | Penzotti | G06Q 30/0251 705/14.49 |
| 2016/0364564 | A1* | 12/2016 | Lee | G06F 21/36 |
| 2018/0124232 | A1* | 5/2018 | Tokutake | H04L 63/0861 |

* cited by examiner

*Primary Examiner* — Tadesse Hailu (57) ABSTRACT

A mobile communication device is disclosed comprising a display, a processor, a non-transitory memory, and a client application that displays a transparent overlay on a lock screen on the display, receives a touch input to the display, and determines whether the touch input corresponds to a portion of the display displaying content of the transparent overlay. In response to determining that the touch input corresponds to the portion of the display displaying the content of the transparent overlay, the client application bypasses the lock screen and displays renewal content. In response to determining that the touch input does not correspond to the portion of the display displaying the content of the transparent overlay, the client application removes the transparent overlay from the display to allow touch inputs to go to the lock screen and enables a security feature to allow unlocking of the mobile communication device based on user input.

16 Claims, 7 Drawing Sheets

MOBILE DEVICE TRANSPARENT SCREEN OVERLAY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may comprise a lock screen on a display of the mobile communication device. The lock screen may regulate access to the full functionality of the mobile communication device. For example, the lock screen may require an input from the user in order to receive access to the mobile communication device.

SUMMARY

In an embodiment, a mobile communication device is disclosed. The mobile communication device comprises a display, a processor, and a non-transitory memory. The mobile communication device also comprises a client application stored in the non-transitory memory that, when executed by the processor, displays a transparent overlay on a lock screen on the display of the mobile communication device. The transparent overlay comprises content including at least one of a message, a picture, an animation, or a video associated with renewing a service subscription. The content is displayed on a portion of the display. The client application also receives a touch input to the display and determines whether the touch input corresponds to the portion of display displaying the content of the transparent overlay. In response to determining that the touch input corresponds to the portion of the display displaying the content of the transparent overlay, the client application bypasses the lock screen and displays renewal content associated with renewing the service subscription on the display. In response to determining that the touch input does not correspond to the portion of the lock screen displaying the transparent overlay, the client application removes the transparent overlay from the display to allow touch inputs to go to the lock screen and enables a security feature to allow unlocking of the mobile communication device based on user input.

In another embodiment, a method for prompting service subscription renewal is disclosed. Each step of the method is performed by a client application stored in a non-transitory memory of a mobile communication device and executable by a processor of the mobile communication. The method comprises displaying a transparent overlay on a lock screen on the display of the mobile communication device. The transparent overlay comprises content including at least one of a message, a picture, an animation, or a video associated with renewing a service subscription. The content is displayed on a portion of the display. The method also comprises receiving a touch input to the display screen and determining whether the touch input corresponds to the portion of the display screen displaying the content of the transparent overlay. The method additionally comprises, in response to determining that the touch input corresponds to the portion of display displaying the content of the transparent overlay, bypassing the lock screen and displaying renewal content associated with renewing the service subscription on the display. The method further comprises, in response to determining that the touch input does not correspond to the portion of the display displaying the content of the transparent overlay, removing the transparent overlay from the display to allow touch inputs to go to the lock screen and enabling a security feature to allow unlocking of the mobile communication device based on user input.

In yet another embodiment, a method for prompting service subscription renewal is disclosed. Each step of the method is performed by a client application stored in a non-transitory memory of a mobile communication device and executable by a processor of the mobile communication. The method comprises displaying a transparent overlay on a lock screen on the display of the mobile communication device. The transparent overlay comprises content including at least one of a message, a picture, an animation, or a video associated with renewing a service subscription. The content is displayed on a portion of the display. The method also comprises, in response to a determination that no touch input corresponding to the portion of the display displaying the content of the transparent overlay has been received and in response to the mobile communication device being unlocked, displaying a second transparent overlay on the display of the mobile communication device before displaying a home screen of the mobile communication device. The second transparent overlay comprises at least one of a message, a picture, an animation, or a video associated with renewing the service subscription. The method additionally comprises, in response to a determination that no touch input corresponding to the second transparent overlay has been received, providing a notification associated with renewal of the service subscription to a notification area on the display of the mobile communication device. The method further comprises, after providing the notification and in response to a determination that the service subscription has yet to be renewed, temporarily replacing a plurality of widgets on a portion of the home screen of the mobile communication device with content associated with renewal of the service subscription.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The pending application is directed to a system and methods that provide a multi-tiered approach on a mobile communication device to promote renewal of a service subscription before expiration of the service subscription. The multi-tiered approach may comprise a client application on the mobile communication device displaying one or more transparent overlays in a prioritized sequence at different points during the cycle of a user using their mobile communication device to increase the chances of renewal of the service subscription. The transparent overlay may comprise content that comprises at least one of a message, a picture, an animation, or a video associated with renewing the service subscription. The initial tier of the multi-tiered approach comprises the client application displaying a transparent overlay on top of a lock screen on a display of the mobile communication device.

A lock screen generally refers to a screen presented after the display of a dark screen, which may also be referred to as a sleep screen display in some contexts, and before the display of a home screen. The lock screen may regulate access to the full functionality of the mobile communication device. For example, the lock screen may wait for an input from the user in order to grant access to the controls of the user equipment (UE). The input from the user may be a swipe screen input, a personal identification number, a biometric input, or another type of user input. After the user input is verified, the user is granted access to the functions of the mobile communication device.

Displaying the transparent overlay on top of the lock screen may provide a unique opportunity to engage the user and encourage them to renew their subscription account because it is the first screen they see after the sleep screen. However, display of a transparent overlay on top of a lock screen of the mobile communication device may cause technical challenges to the traditional functionality of the lock screen because an overlay layer typically receives all of the inputs. If the transparent overlay on the lock screen received all of the inputs, the traditional functionality of lock screen would be impaired, and the mobile communication device would be indefinitely locked.

To address the above technical challenge, the pending application provides a technical solution. In particular, the client application may display the transparent overlay on top of the lock screen on the display of the mobile communication device, but the content of the transparent overlay may only reside on a portion of the display of the mobile communication device. Thus, the client application may determine whether a touch input to the display corresponds to the portion of the display displaying the content of the transparent overlay. In response to determining that the touch input corresponds to the portion of the display displaying the content of the transparent overlay, the client application may bypass the lock screen and display renewal content associated with renewing the service subscription on the display. The renewal content may comprise an offer to renew the service subscription. In response to determining that the touch input does not correspond to the portion of the display displaying the content of the transparent overlay, the client application may remove the transparent overlay from the display to allow touch inputs to go to the lock screen and enable a security feature to allow unlocking of the mobile communication device based on user input, thereby maintaining the traditional functionality of the lock screen.

If the user of the mobile communication device does not engage with the transparent overlay on the lock screen, a second tier of the multi-tiered approach may comprise the client application displaying a second transparent overlay prior to expiration of the service subscription, but at a different point during the cycle of the user using their mobile communication device. For example, in response to determining that the touch input does not correspond to the portion of the display displaying the content of the transparent overlay and in response to the mobile communication device being unlocked, the client application may display a second transparent overlay on the display of the mobile communication device before displaying a home screen of the mobile communication device. Displaying the second overlay before displaying the home screen of the mobile communication device may provide another unique opportunity to engage the user and encourage them to renew their service subscription before the user has the opportunity to become engrossed with the icons, widgets, and/or the indications of any updates (e.g., new unread text messages present, new unread email arrived, etc.) on the home screen.

If the user interacts with the second overlay, the client application may display renewal content associated with renewing the service subscription on the display. For example, in response to determining that a second touch input corresponds to at least a portion of the display displaying the second transparent overlay, the client application displays renewal content associated with renewing the service subscription on the display. In response to determining that the second touch input does not correspond to the at least the portion of the display displaying the second transparent overlay, the client application may remove the second transparent overlay and reveal the home screen, thereby allowing touch inputs to go to the home screen.

If the user does not engage with the transparent overlay on the lock screen or the second transparent overlay displayed after the lock screen and before the home screen, a third tier of the multi-tiered approach may comprise the client application providing a notification associated with renewal of the service subscription to a notification area on the display of the mobile communication device before expiration of the service subscription. For example, in response to determining that the second touch input does not correspond to the at least the portion of the display displaying the second transparent overlay, the client application may provide a notification associated with renewal of the service subscription to a notification area on the display of the mobile communication device.

If the user does not respond to the notification, a fourth tier of the multi-tiered approach may comprise the client application temporarily replacing a plurality of widgets on a portion of the home screen with content associated with renewal of the service subscription before expiration of the service subscription. For example, after providing the notification and in response to a determination that the service subscription has yet to be renewed, the client application may temporarily replace a plurality of widgets on a portion of the home screen of the mobile communication device with content associated with renewal of the service subscription. This prioritized, multi-tiered approach may help retain customers of the service subscription.

While the multi-tiered approach is discussed above as being applied to promote subscription renewal, this multi-tiered approach could be applied in different contexts without departing from the spirit or scope of the disclosure. For example, the multi-tiered approach could be applied to promote content (e.g., promotional, informational, or entertainment content). In another example, the multi-tiered approached could be applied to promote sales for an upcoming event such as concert or sporting event. In yet another example, the multi-tiered approach could be applied to promote scheduling an upcoming appointment (e.g., an annual physical, annual eye doctor's appointment, semi-annual dentist appointment, etc.).

Figure 1:
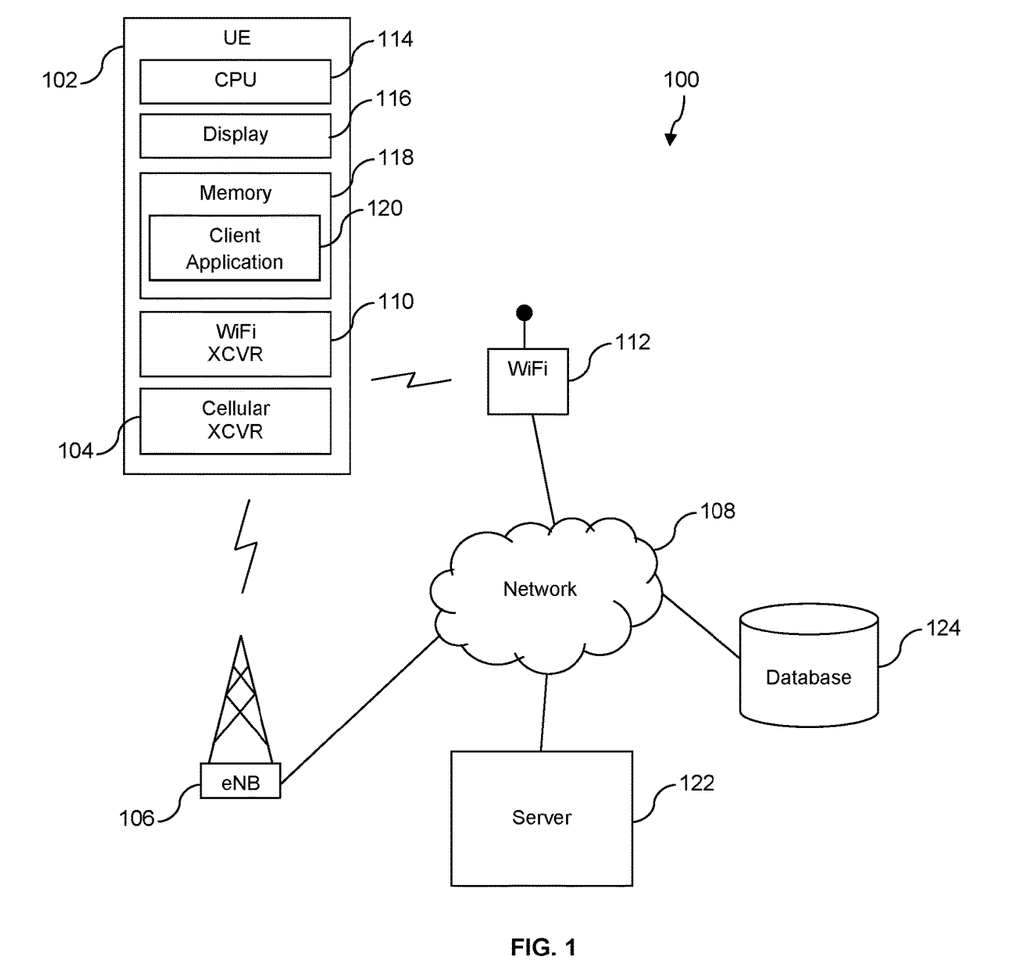
FIG. 1 is a block diagram of a communication system according to an embodiment of the disclosure.

Turning now to FIG. 1, a system 100 is described. In an embodiment, the system 100 comprises a user equipment (UE) 102 having a cellular radio transceiver 104 that may be able to establish a wireless communication link to a cell site 106 which communicatively links the UE 102 to a network 108. The UE 102 may further comprise a WiFi radio transceiver 110 that may establish a wireless communication link to a WiFi access point (AP) 112 which communicatively links the UE 102 to the network 108. The UE 102 may further comprise a processor 114, a display 116, and a memory 118. The memory 118 may store a client application 120. The client application 120 may be stored in a non-transitory region of the memory 118.

The UE 102 may be referred to as a mobile communication device. The UE 102 may be a mobile phone, a smart phone, a personal digital assistant (PDA), a media player, a wearable computer, a headset computer, a laptop computer, a notebook computer, or a tablet computer. The cell site 106 may be an enhanced Node B (eNB), a base transceiver station (BTS), a picocell, or other cellular radio access network (RAN) access point. The cell site 106 may provide a cellular wireless communication link to the UE 102 according to at least one of a long-term evolution (LTE), a code division multiple access (CDMA), a global system for mobile communications (GSM), or a worldwide interoperability for microwave access (WiMAX) cellular telecommunication protocol. The system 100 may comprise any number of UEs 102, any number of cell sites 106, and any number of WiFi APs 112.

The system 100 may also comprise a server 122, which may be implemented as a computer system. Computer systems are described further hereinafter. The system 100 may further comprise a database 124. The server 122 may be communicatively coupled via the network 108 to the database 124. The network 108 comprises one or more private networks, one or more public networks, or a combination thereof. The network 108 promotes communication as desired among the server 122 and the database 124 and communication of the UE 102 to other UEs and host computers (not shown).

In an embodiment, the client application 120 implements instructions to provide a prioritized, multi-tiered approach on the UE 102 to promote renewal of a service subscription before the service subscription expires. The service subscription may comprise a wireless communication service subscription or a different type of service subscription for example access to premium content or streamed video. The instructions implemented by the client application 120 may be received or downloaded from the server 122.

The multi-tiered approach may comprise the client application 120 displaying one or more transparent overlays in a prioritized sequence at different points during the cycle of a user using the UE 102 to increase the chances of renewal of the service subscription. For example, the initial tier of the multi-tiered approach may comprise the client application 120 displaying a transparent overlay on a lock screen on the display 116 of the mobile communication device. Displaying the transparent overlay on the lock screen may provide a unique opportunity to engage the user and encourage them to renew their subscription account because it is the first screen they see after the sleep screen. The transparent overlay may comprise content that comprises at least one of a message, a picture, an animation, a video, or some other content associated with renewing the service subscription. The transparent overlay may be based on a user profile associated with a user of the UE 102. The user profile may comprise demographic information and/or other user information and may be stored in the database 124. For example, if the user profile indicates that the user is a sports fan, the content of the second transparent overlay may include sports related undertones. In an embodiment, the transparent overlay is stored in the database 124 and received by the UE 102 from the server 122. In some instances, the transparent overlay may be pre-loaded on to the UE 102 and stored in the memory 118.

The initial tier of the multi-tiered approach, which includes the displaying of the transparent overlay on the lock screen of the UE 102, may be triggered based on one or more factors. For example, the server 122 may maintain a list of customers who are a potential churn risk. A customer who is a potential churn risk may be likely to not renew their service subscription and/or may decide to subscribe to a different service. If the UE 102 is on the list, the client application 120 may receive a command or prompt from the server 122 and display the transparent overlay on the lock screen of the UE 102. In another example, the transparent overlay may be displayed on the lock screen of the UE 102 based on the service subscription expiring within a predefined amount of time. The client application 120 may determine that the service subscription is expiring within the predefined amount of time or the server 122 may make the determination and send a command or prompt to the UE. In yet another example, the transparent overlay may be displayed on the lock screen of the UE 102 based on a location of the UE 102. For instance, the location of the UE 102 may be monitored or tracked, such as for example by the server 122. If the location of the UE 102 is or was in the vicinity of a competitor's store, the client application 120 may receive a command or prompt from the server 122 and initiate the multi-tiered approach by displaying the transparent overlay on the lock screen of the UE 102. While each factor is discussed above in isolation, the initial tier of the multi-tiered approach may be triggered based on a combination of any of the factors discussed above (e.g., the UE 102 is on the list and the service subscription is expiring within the predefined amount of time, the UE 102 is on the list and a determination has been made the UE 102 has been within the vicinity of a competitor's store, etc.).

The traditional functionality of the lock screen of the UE 102 may be to regulate access to the full functionality of the UE 102. For example, the lock screen may wait for an input from the user in order to grant access to the controls of the UE 102. The input from the user may be a swipe input, a personal identification number, a biometric input, or another type of user input. After the user input is verified, the user is granted access to the functions of the UE 102.

Display of the transparent overlay on the lock screen of the UE 102 may cause technical challenges to providing the traditional functionality of the lock screen because a top layer typically receives all of the inputs and the overlay is the top layer. If the transparent overlay on the lock screen received all of the inputs, the traditional functionality of lock screen would be impaired, and the UE 102 would be indefinitely locked. To address this technical challenge, the pending application provides a technical solution. In particular, the client application 120 may display the transparent overlay on top of the lock screen on the display 116 of the UE 102, but the content of the transparent overlay may only reside on a portion of the display 116 of the UE 102. Thus, the client application 120 may determine whether a touch input to the display 116 corresponds to the portion of the display 116 displaying the content of the transparent display.

In an embodiment, in response to determining that the touch input corresponds to the portion of the display 116 displaying the content of the transparent display, the client application 120 bypasses the lock screen and displays renewal content associated with renewing the service subscription on the display 116. Bypassing the lock screen may comprise unlocking the UE 102 without requiring user input. The renewal content may comprise an offer to renew the service subscription. The renewal content may be based on a user profile associated with a user of the UE 102. The user profile may comprise demographic information, phone type information, usage amount information, or other user information. The user profile and/or the renewal content may be stored in the database 124. In an embodiment, the renewal content is received by the UE 102 from the server 122. In some instances, the renewal content may be pre-loaded on to the UE 102 and stored in the memory 118.

In response to determining that the touch input does not correspond to the portion of the display 116 displaying the content of the transparent display, the client application 120 may remove the transparent overlay from the display 116 to allow touch inputs to go to the lock screen and enable a security feature to allow unlocking of the UE 102 based on user input, thereby maintaining the traditional functionality of the lock screen. The user input for the security feature may comprise a swipe input, a personal identification number, a biometric input, or another type of input. Examples of a biometric based security feature may comprise fingerprint recognition, facial recognition, and iris recognition. In some embodiments, if the user does not interact with the transparent overlay on the lock screen and/or the user has not yet renewed the service subscription, the client application 120 may wait a predetermined amount of time and then re-display the transparent overlay on the lock screen of the UE 102 or display a different transparent overlay on the lock screen of the UE 102 before expiration of the service subscription.

If the user of the UE 102 does not engage with the transparent overlay on the lock screen, a second tier of the multi-tiered approach may comprise the client application 120 displaying a second transparent overlay prior to expiration of the service subscription, but at a different point during the cycle of the user using the UE 102. For example, in response to determining that the touch input does not correspond to the portion of the display 116 displaying the content of the transparent display and in response to UE 102 being unlocked, the client application 120 may display a second transparent overlay on the display 116 of the UE 102 before displaying a home screen of the UE 102. Displaying the second overlay before displaying the home screen of the UE 102 may provide another unique opportunity to engage the user and encourage them to renew their service subscription before the user has the opportunity to become engrossed with the icons, widgets, and/or the indications of any updates (e.g., new unread text messages present, new unread email arrived, etc.) on the home screen. The display of the second transparent overlay may be minutes, hours, days, weeks, or some other amount of time after the display of the transparent overlay on the lock screen.

The second transparent overlay may comprise the same or different content than the virtual overlay displayed on the lock screen of the UE 102. The second transparent overlay may comprise content that comprises at least one of a message, a picture, an animation, a video, or some other content associated with renewing the service subscription. In an embodiment, the second transparent overlay is based on a user profile associated with a user of the UE 102. The user profile may comprise demographic information and/or other user information and may be stored in the database 124. For example, if the user profile indicates that the user is a sports fan, the content of the second transparent overlay may include sports related undertones. In an embodiment, the second transparent overlay is stored in the database 124 and received by the UE 102 from the server 122. In some instances, the second transparent overlay may be pre-loaded on to the UE 102 and stored in the memory 118.

The second tier of the multi-tiered approach, which includes the displaying of the second transparent overlay on the display 116 of the UE 102 after the lock screen and before the home screen is displayed on the UE 102, may be triggered based on one or more factors. For example, the server 122 may maintain a list of customers who are a potential churn risk. If the UE 102 is on the list, the second transparent overlay may be displayed on the UE 102 before displaying the home screen. In another example, the second transparent overlay may be displayed on the UE 102 before displaying the home screen based on the service subscription expiring within a predefined amount of time. In yet another example, the second transparent overlay may be displayed on the UE 102 before displaying the home screen based on a location of the UE 102. For instance, the location of the UE 102 may be monitored or tracked, such as for example by the server 122. If the location of the UE 102 is or was in the vicinity of a competitor's store, the client application 120 may initiate the second tier of the multi-tiered approach by displaying the second transparent overlay on the UE 102 before displaying the home screen. While each factor is discussed above in isolation, the second tier of the multi-tiered approach may be triggered based on a combination of any of the factors discussed above.

If the user interacts with the second overlay, the client application 120 may display renewal content associated with renewing the service subscription on the display 116. For example, in response to determining that a second touch input corresponds to at least a portion of the display 116 displaying the second transparent overlay, the client application 120 displays renewal content associated with renewing the service subscription on the display 116. The renewal content may comprise an offer to renew the service subscription. The renewal content may be based on a user profile associated with a user of the UE 102. The user profile may comprise demographic information, phone type information, usage amount information, or other user information. The user profile and/or the renewal content may be stored in the database 124. In an embodiment, the renewal content is received by the UE 102 from the server 122. In some instances, the renewal content may be pre-loaded on to the UE 102 and stored in the memory 118. In an embodiment, the renewal content displayed in response to selection of the second transparent overlay is different than the renewal content that is displayed if the transparent overlay on the lock screen is selected. For instance, the renewal content displayed in response to selection of the second transparent overlay may be more attractive to the user of the UE 102 (e.g., less money to renew, more services included with the renewal, etc.) to try to persuade the user to renew the subscription service since the expiration time is closer.

In response to determining that the second touch input does not correspond to the at least the portion of the display 116 displaying the second transparent overlay, the home screen may be displayed on the display 116 of the UE 102. In some embodiments, if the user does not interact with the second transparent overlay and/or the user has not yet renewed the service subscription, the client application 120 may wait a predetermined amount of time and then, after the user unlocks the UE 102 a different time, the client application 120 may re-display the second transparent overlay on display 116 before displaying the home screen or display a different transparent overlay before displaying the home screen prior to expiration of the service subscription. The re-display of the transparent overlay of the lock screen may be minutes, hours, days, weeks, or some other amount of time after the initial display of the transparent overlay on the lock screen.

If the user does not engage with the transparent overlay on the lock screen or the second transparent overlay displayed after the lock screen and before the home screen, a third tier of the multi-tiered approach may comprise the client application 120 providing a notification associated with renewal of the service subscription to a notification area on the display 116 of the UE 102 before expiration of the service subscription. For example, in response to determining that the second touch input does not correspond to the at least the portion of the display 116 displaying the second transparent overlay, the client application 120 may provide a notification associated with renewal of the service subscription to a notification area on the display 116 of the UE 102. The notification may be provided minutes, hours, days, weeks, or some other amount of time after the display of the second transparent overlay. In an embodiment, the notification is based on a user profile associated with a user of the UE 102. The user profile may comprise demographic information and/or other user information and may be stored in the database 124. The third tier of the multi-tiered approach may be triggered based on one or more factors (e.g., based on a location of the UE 102, based on the service subscription expiring within a predefined amount of time, etc.).

In an embodiment, in response to selection of the notification, the client application 120 provides renewal content to the display 116 of the UE 102. The renewal content may comprise an offer to renew the service subscription. The renewal content may be based on a user profile associated with a user of the UE 102. The user profile may comprise demographic information, phone type information, usage amount information, or other user information. The user profile and/or the renewal content may be stored in the database 124. In an embodiment, the renewal content is received by the UE 102 from the server 122. In some instances, the renewal content may be pre-loaded on to the UE 102 and stored in the memory 118. In an embodiment, the renewal content displayed in response to selection of the notification is different than the renewal content that is displayed if the second transparent overlay is selected and/or the renewal content that is displayed if the transparent overlay on the lock screen is selected. For instance, the renewal content displayed in response to selection of the notification may be more attractive to the user of the UE 102 (e.g., less money to renew, more services included with the renewal, etc.) to try to persuade the user to renew the subscription service since the expiration time is closer.

In response to determining that the user did not respond to the notification, the client application 120 may remove the notification from the notification area. In some embodiments, if the user does not interact with the notification and/or the user has not yet renewed the service subscription, the client application 120 may wait a predetermined amount of time and then provide the notification or a different notification for display in the notification area on the display 116 of the UE 102. The providing of the notification or the different notification may occur minutes, hours, days, weeks, or some other amount of time after the notification is initially provided.

If the user does not respond to the transparent overlay, the second transparent overlay, and/or the notification, a fourth tier of the multi-tiered approach may comprise the client application 120 temporarily replacing a plurality of widgets on a portion of the home screen with content associated with renewal of the service subscription before expiration of the service subscription. For example, after providing the notification and in response to a determination that the service subscription has yet to be renewed, the client application 120 may temporarily replace a plurality of widgets on a portion of the home screen of the UE 102 with content associated with renewal of the service subscription. The plurality of widgets may be replaced with the content minutes, hours, days, weeks, or some other amount of time after the notification is provided. In an embodiment, the content is based on a user profile associated with a user of the UE 102. The user profile may comprise demographic information and/or other user information and may be stored in the database 124. In an embodiment, the plurality of widgets comprises eight widgets. However, the plurality of widgets may comprise any number of widgets without departing from the spirit or scope of the disclosure. The fourth tier of the multi-tiered approach may be triggered based on one or more factors (e.g., based on a location of the UE 102, based on the service subscription expiring within a predefined amount of time, etc.).

In an embodiment, in response to selection of the content, the client application 120 provides renewal content to the display 116 of the UE 102. The renewal content may comprise an offer to renew the service subscription. The renewal content may be based on a user profile associated with a user of the UE 102. The user profile may comprise demographic information, phone type information, usage amount information, or other user information. The user profile and/or the renewal content may be stored in the database 124. In an embodiment, the renewal content is received by the UE 102 from the server 122. In some instances, the renewal content may be pre-loaded on to the UE 102 and stored in the memory 118. In an embodiment, the renewal content displayed in response to selection of the content is different than the renewal content that is displayed if the notification is selected, the renewal content that is displayed if the second transparent overlay is selected, and/or the renewal content that is displayed if the transparent overlay on the lock screen is selected. For instance, the renewal content displayed in response to selection of the content that temporarily replaces the plurality of widgets on the home screen may be more attractive to the user of the UE 102 (e.g., less money to renew, more services included with the renewal, etc.) to try to persuade the user to renew the subscription service since the expiration time is closer.

In response to determining that the user did not respond to the content that temporarily replaced the plurality of widgets on the home screen, the client application 120 may restore the plurality of widgets to the home screen. In some embodiments, if the user does not interact with the content and/or the user has not yet renewed the service subscription, the client application 120 may wait a predetermined amount of time and then temporarily replace the plurality of widgets on the home screen of the UE 102 with the same content or with different content. The replacement of the plurality of widgets with the same content or different content may occur minutes, hours, days, weeks, or some other amount of time after the plurality of widgets are initially replaced with the content.

While discussed above as the third and fourth tiers, in some embodiments the fourth tier may occur before the third tier. For example, the client application 120 may temporarily replace a plurality of widgets on a portion of the home screen with content associated with renewal of the service subscription if the user does not engage with the transparent overlay or the second transparent overlay, and then later (e.g., if the content is not selected), the client application 120 may provide a notification associated with renewal of the service subscription to a notification area on the display 116 of the UE 102.

Figure 2:
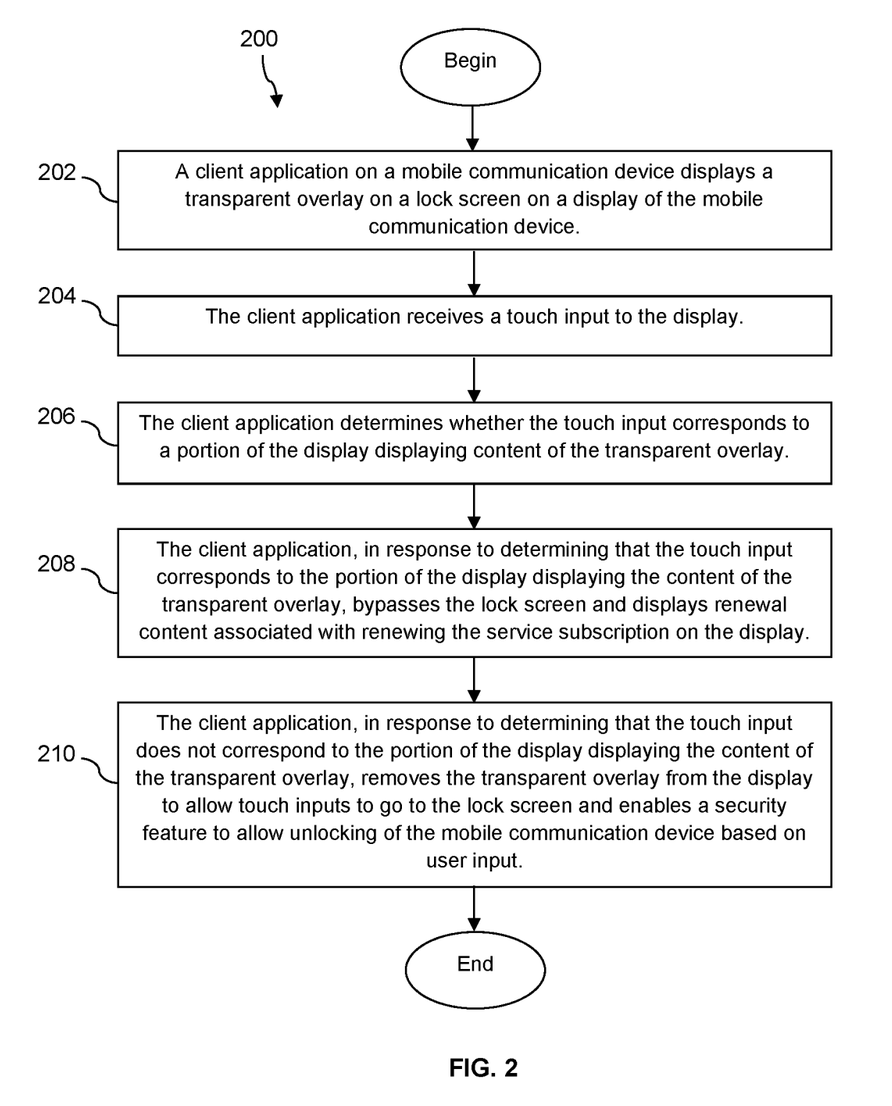
FIG. 2 is a flow chart of a method according to an embodiment of the disclosure.

Turning now to FIG. 2, a method 200 is described. At block 202, a client application (e.g., the client application 120) on a mobile communication device (e.g., the UE 102) displays a transparent overlay on the lock screen on a display (e.g., the display 116) of the mobile communication device. At block 204, the client application 120 receives a touch input to the display. At block 206, the client application 120 determines whether the touch input corresponds to a portion of the display displaying a content of the transparent overlay. At block 208, the client application 120, in response to determining that the touch input corresponds to the portion of the display displaying the content of the transparent overlay, bypasses the lock screen and displays renewal content associated with renewing the service subscription on the display 116. At block 210, the client application, in response to determining that the touch input does not correspond to the portion of the display displaying the content of the transparent overlay, removes the transparent overlay from the display 116 to allow touch inputs to go to the touch screen and enables a security feature to allow unlocking of the mobile communication device based on user input.

Figure 3:
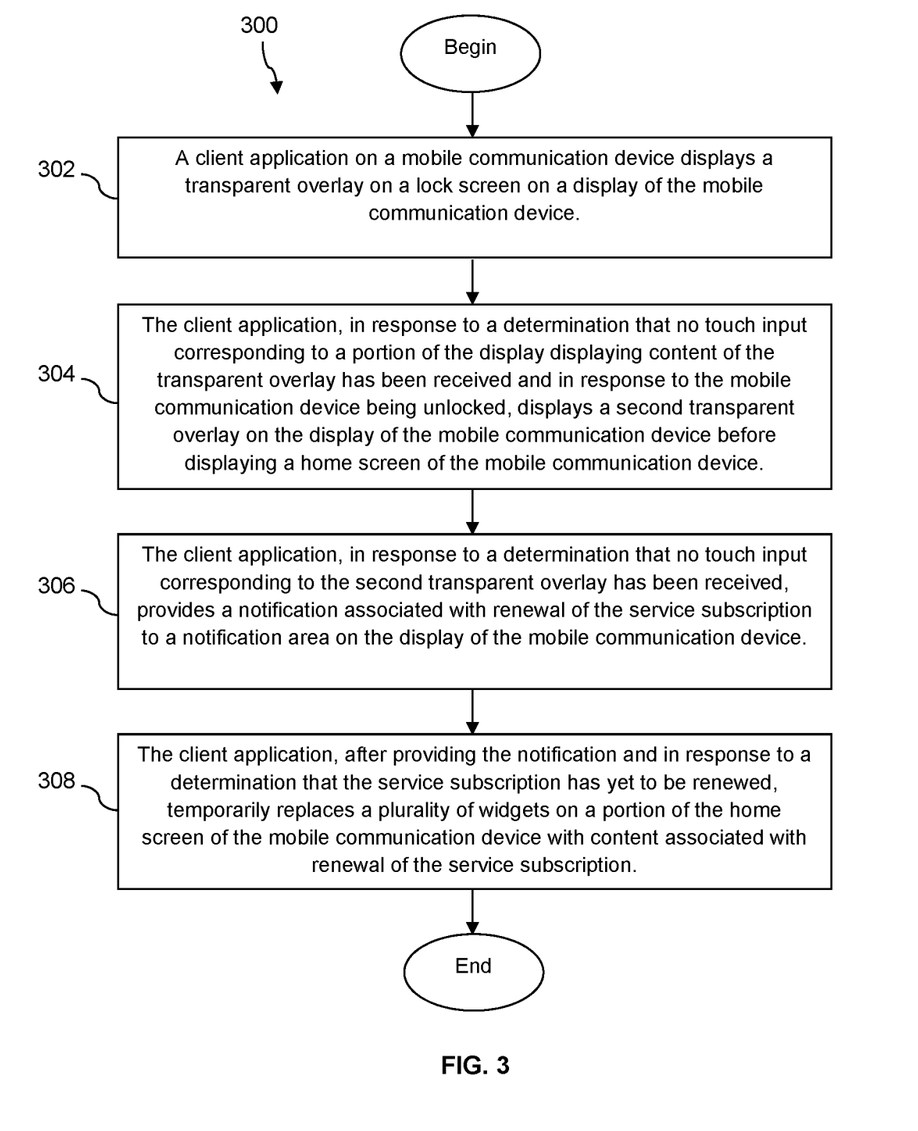
FIG. 3 is a flow chart of another method according to an embodiment of the disclosure.

Turning now to FIG. 3, a method 300 is described. At block 302, a client application (e.g., the client application 120) on a mobile communication device (e.g., the UE 102) displays a transparent overlay on a lock screen on a display (e.g., the display 116) of the mobile communication device. At block 304, the client application 120, in response to a determination that no touch input corresponding to a portion of the display displaying a content of the transparent overlay has been received and in response to the mobile communication device being unlocked, displays a second transparent overlay on the display 116 of the mobile communication device before displaying a home screen of the mobile communication device.

At block 306, the client application 120, in response to a determination that no touch input corresponding to the second transparent overlay has been received, provides a notification associated with renewal of the service subscription to a notification area on the display 116 of the mobile communication device. At block 308, the client application 120, after providing the notification and in response to a determination that the service subscription has yet to be renewed, temporarily replaces a plurality of widgets on a portion of the home screen of the mobile communication device with content associated with renewal of the service subscription.

Figure 4:
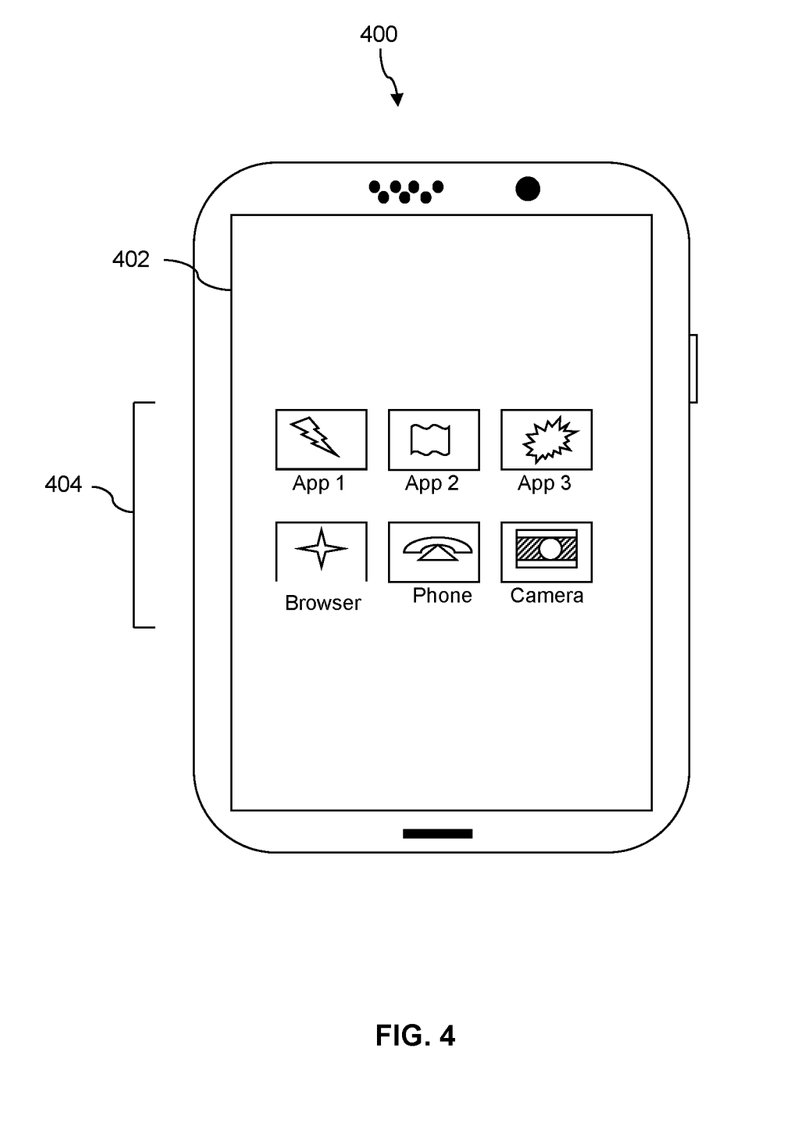
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
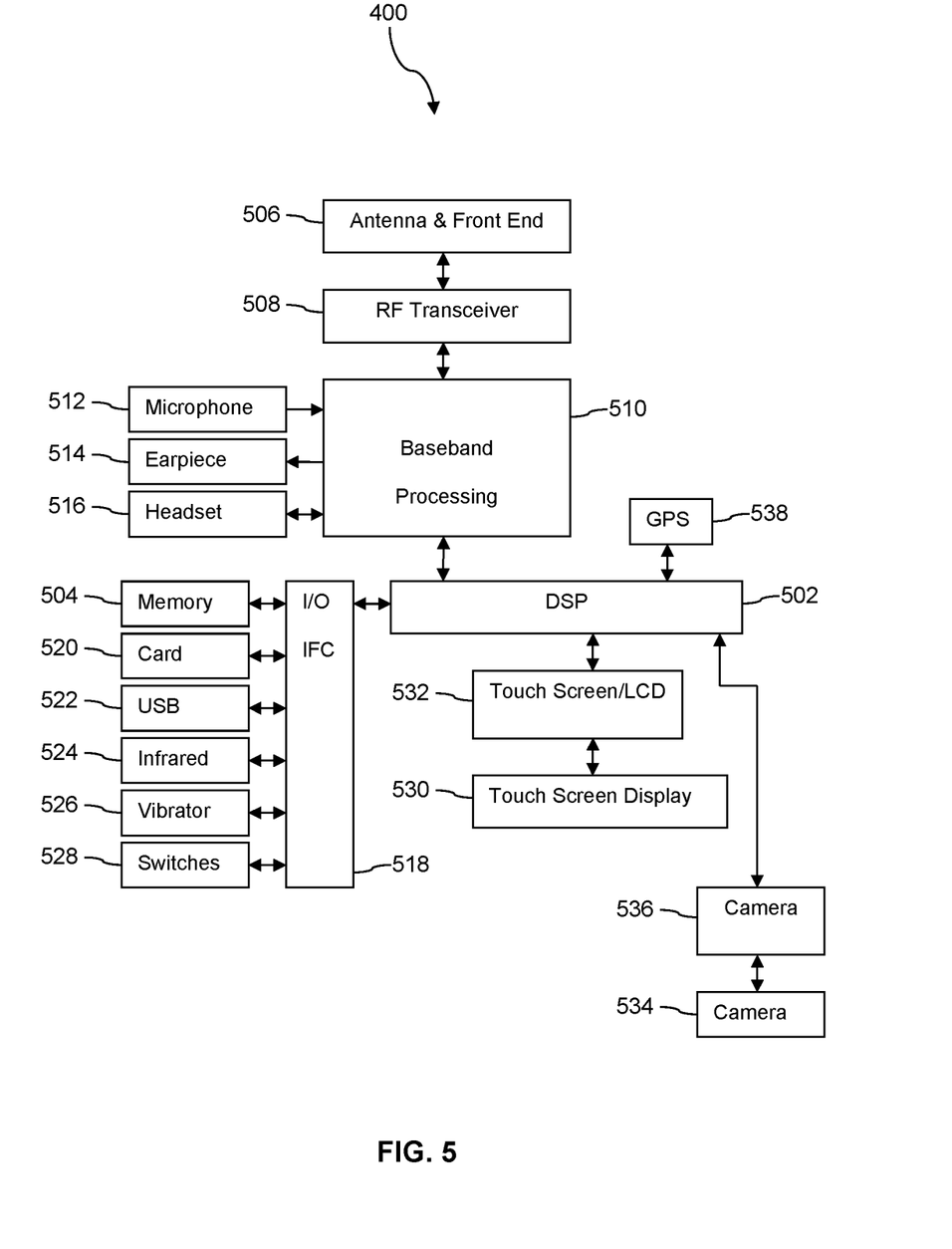
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
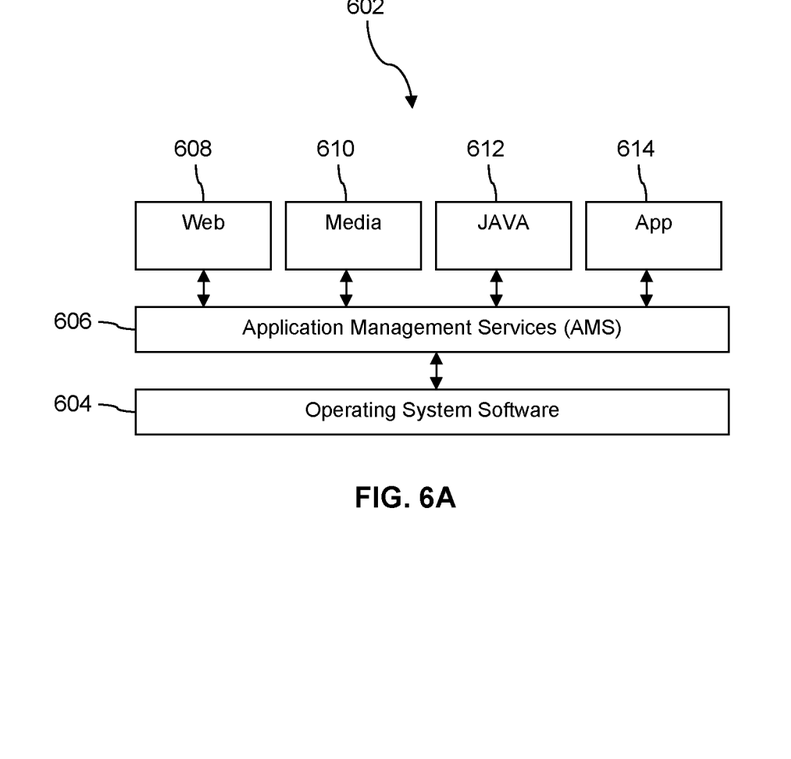
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. In an embodiment, a third party application 614 may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

The third party application 614 may be dynamically downloaded and installed during a first time that the mobile communication device 400 enters a retail store (e.g., any of a plurality of retails stores associated with a particular enterprise) and may be activated on subsequent entries into a retail store. Alternatively, the third party application 614 may be installed in another way (e.g., the user elects to install the application 614, for example to obtain coupons or other desirable features provided via the application 614).

Figure 6B:
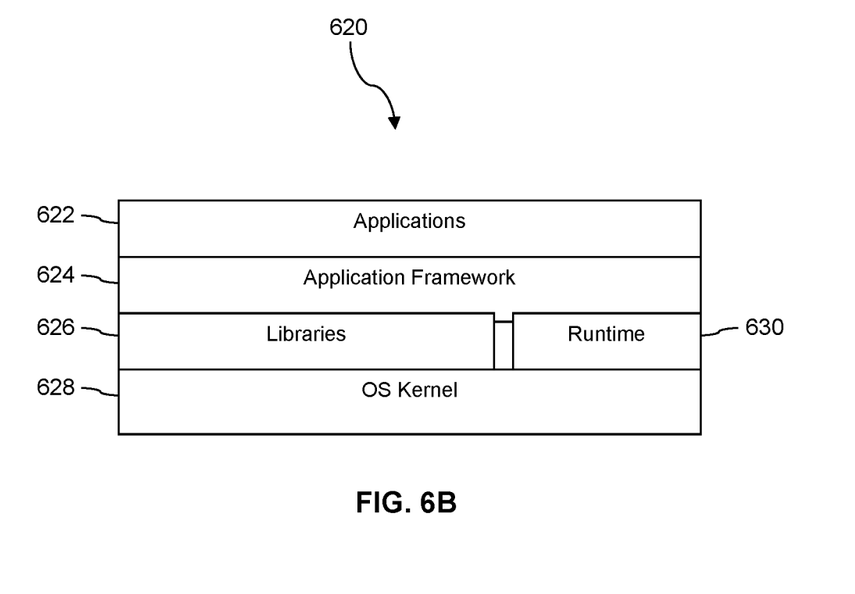
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
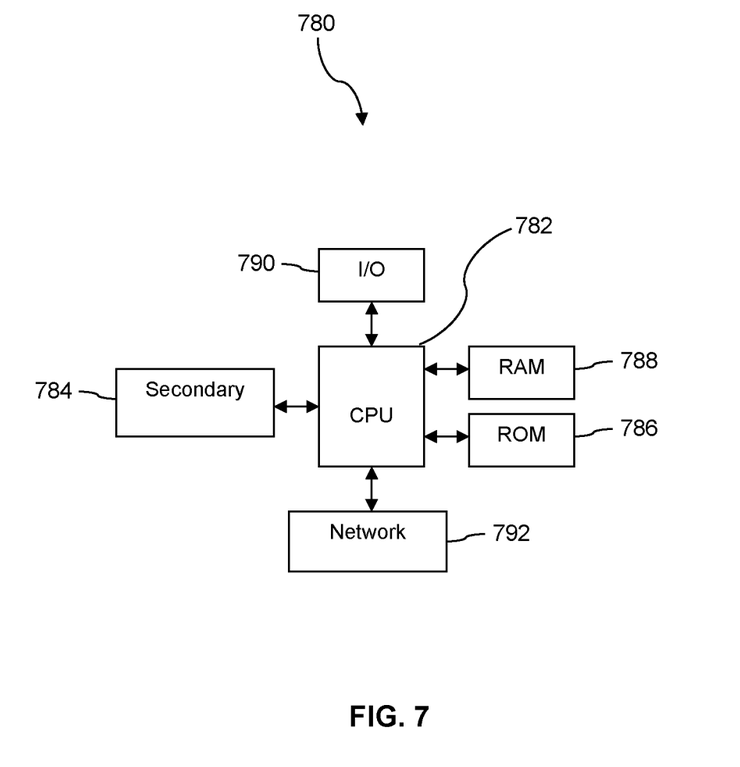
FIG. 7 is a block diagram of a computer system according to an embodiment of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 780 is turned on or booted, the CPU 782 may execute a computer program or application. For example, the CPU 782 may execute software or firmware stored in the ROM 786 or stored in the RAM 788. In some cases, on boot and/or when the application is initiated, the CPU 782 may copy the application or portions of the application from the secondary storage 784 to the RAM 788 or to memory space within the CPU 782 itself, and the CPU 782 may then execute instructions that the application is comprised of. In some cases, the CPU 782 may copy the application or portions of the application from memory accessed via the network connectivity devices 792 or via the I/O devices 790 to the RAM 788 or to memory space within the CPU 782, and the CPU 782 may then execute instructions that the application is comprised of. During execution, an application may load instructions into the CPU 782, for example load some of the instructions of the application into a cache of the CPU 782. In some contexts, an application that is executed may be said to configure the CPU 782 to do something, e.g., to configure the CPU 782 to perform the function or functions promoted by the subject application. When the CPU 782 is configured in this way by the application, the CPU 782 becomes a specific purpose computer or a specific purpose machine.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), flash drive, ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer system 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device comprising:
   a display;
   a processor;
   a non-transitory memory; and
   a client application stored in the non-transitory memory that, when executed by the processor:
   displays a transparent overlay on a lock screen on the display of the mobile communication device in response to the mobile communication device being identified as a potential churn risk based on at least one of a service subscription expiring within a predefined amount of time or a location of the mobile communication device, wherein the transparent overlay comprises content including at least one of a message, a picture, an animation, or a video associated with renewing the service subscription, and wherein the content is displayed on a portion of the display,
   receives a touch input to the display,
   determines whether the touch input corresponds to the portion of display displaying the content of the transparent overlay,
   in response to determining that the touch input corresponds to the portion of the display displaying the content of the transparent overlay, bypasses the lock screen and displays renewal content associated with renewing the service subscription on the display,
   in response to determining that the touch input does not correspond to the portion of the lock screen displaying the transparent overlay, removes the transparent overlay from the display to allow touch inputs to go to the lock screen and enables a security feature to allow unlocking of the mobile communication device based on user input, and
   in response to determining that the touch input does not correspond to the portion of the display displaying the content of the transparent overlay and in response to determining that the service subscription has yet to be renewed, re-displays the transparent overlay on the lock screen on the display of the mobile communication device after a predetermined amount of time.

2. The mobile communication device of claim 1, wherein the user input for the security feature comprises a personal identification number or a biometric input.

3. The mobile communication device of claim 1, wherein the application further:
   in response to determining that the touch input does not correspond to the portion of the display displaying the content of the transparent overlay and in response to the mobile communication device being unlocked, displays a second transparent overlay on the display of the mobile communication device before displaying a home screen of the mobile communication device, wherein the second transparent overlay comprises at least one of a message, a picture, an animation, or a video, and
   in response to determining that a second touch input corresponds to at least a portion of the display displaying the second transparent overlay, displays renewal content associated with renewing the service subscription on the display.

4. The mobile communication device of claim 3, wherein the application further:
   in response to determining that the second touch input does not correspond to the at least the portion of the display displaying the second transparent overlay, at least one of:
      provides a notification associated with renewal of the service subscription to a notification area on the display of the mobile communication device, or
      temporarily replaces a plurality of widgets on a portion of the home screen of the mobile communication device with content associated with renewal of the service subscription.

5. A method for prompting service subscription renewal, each step of the method performed by a client application stored in a non-transitory memory of a mobile communication device and executable by a processor of the mobile communication, the method comprising:
   displaying a transparent overlay on a lock screen on the display of the mobile communication device in response to the mobile communication device being identified as a potential churn risk based on at least one of a service subscription expiring within a predefined amount of time or a location of the mobile communication device, wherein the transparent overlay comprises content including at least one of a message, a picture, an animation, or a video associated with renewing a service subscription, and wherein the content is displayed on a portion of the display;
   receiving a touch input to the display screen;
   determining whether the touch input corresponds to the portion of the display screen displaying the content of the transparent overlay;
   in response to determining that the touch input corresponds to the portion of display displaying the content of the transparent overlay, bypassing the lock screen and displaying renewal content associated with renewing the service subscription on the display;
   in response to determining that the touch input does not correspond to the portion of the display displaying the content of the transparent overlay, removing the transparent overlay from the display to allow touch inputs to go to the lock screen and enabling a security feature to allow unlocking of the mobile communication device based on user input; and
   in response to determining that the touch input does not correspond to the portion of the display displaying the content of the transparent overlay and in response to the mobile communication device being unlocked and prior to expiration of the service subscription, displaying a second transparent overlay on the display of the mobile communication device after displaying the lock screen and before displaying a home screen of the mobile communication device, wherein the second transparent overlay comprises at least one of a message, a picture, an animation, or a video associated with renewing the service subscription.

6. The method of claim 5, further comprising:
   in response to determining that the touch input does not correspond to the portion of the display displaying the content of the transparent overlay, re-displaying the transparent overlay on the lock screen on the display of the mobile communication device after a predetermined amount of time.

7. The method of claim 6, further comprising:
   in response to a determination that a second touch input does not correspond to the at least the portion of the display displaying the second transparent overlay, providing a notification associated with renewal of the service subscription to a notification area on the display of the mobile communication device; and
   after providing the notification and in response to a determination that the service subscription has yet to be renewed, temporarily replacing a plurality of widgets on a portion of the home screen of the mobile communication device with content associated with renewal of the service subscription.

8. The method of claim 5, wherein the transparent overlay is based on a user profile associated with the mobile communication device.

9. The method of claim 5, wherein the renewal content is based on a user profile associated with the mobile communication device.

10. The method of claim 5, wherein the service subscription comprises a wireless communication service subscription.

11. A method for prompting service subscription renewal, each step of the method performed by a client application stored in a non-transitory memory of a mobile communication device and executable by a processor of the mobile communication device, the method comprising:
    displaying a transparent overlay on a lock screen on the display of the mobile communication device in response to the mobile communication device being identified as a potential churn risk based on at least one of a service subscription expiring within a predefined amount of time or a location of the mobile communication device, wherein the transparent overlay comprises content including at least one of a message, a picture, an animation, or a video associated with renewing a service subscription, and wherein the content is displayed on a portion of the display;
    in response to a determination that no touch input corresponding to the portion of the display displaying the content of the transparent overlay has been received and in response to the mobile communication device being unlocked and prior to expiration of the service subscription, displaying a second transparent overlay on the display of the mobile communication device after displaying the lock screen and before displaying a home screen of the mobile communication device, wherein the second transparent overlay comprises at least one of a message, a picture, an animation, or a video associated with renewing the service subscription;
    in response to a determination that no touch input corresponding to the second transparent overlay has been received, providing a notification associated with renewal of the service subscription to a notification area on the display of the mobile communication device; and
    after providing the notification and in response to a determination that the service subscription has yet to be renewed, temporarily replacing a plurality of widgets on a portion of the home screen of the mobile communication device with content associated with renewal of the service subscription.

12. The method of claim 11, wherein display of the second transparent overlay on the display of the mobile communication device is based on a location of the mobile communication device.

13. The method of claim 11, wherein the transparent overlay and the second transparent overlay comprise the same content.

14. The method of claim 11, further comprising:
prior to displaying the second transparent overlay, re-displaying the transparent overlay on the lock screen on the display of the mobile communication device after a predetermined amount of time from the initial display of the transparent overlay.

15. The method of claim 11, further comprising:
in response to a determination that a touch input corresponding to the transparent overlay has been received, displaying a first renewal content associated with renewing the service subscription;
in response to a determination that a touch input corresponding to the second transparent overlay has been received, displaying a second renewal content associated with renewing the service subscription;
in response to a determination that a touch input corresponding to the notification has been received, displaying a third renewal content associated with renewing the service subscription; and
in response to a determination that a touch input corresponding to the content that replaced the plurality of widgets has been received, displaying a fourth renewal content associated with renewing the service subscription.

16. The method of claim 15, wherein each of the first renewal content, the second renewal content, the third renewal content, and the fourth renewal content comprise a different offer for renewing the service subscription.

* * * * *